US011689896B2

(12) United States Patent
N et al.

(10) Patent No.: US 11,689,896 B2
(45) Date of Patent: Jun. 27, 2023

(54) SECURE REMOTE ACCESS TO PRIVATE NETWORKS WITHOUT INTERNET CONNECTIVITY

(71) Applicant: EMC IP Holding Company LLC, Hopkinton, MA (US)

(72) Inventors: Vaneeswaran N, Bangalore (IN); Dheepan R, Tamil Nadu (IN)

(73) Assignee: EMC IP Holding Company LLC, Hopkinton, MA (US)

(*) Notice: Subject to any disclaimer, the term of this patent is extended or adjusted under 35 U.S.C. 154(b) by 163 days.

(21) Appl. No.: 17/187,285

(22) Filed: Feb. 26, 2021

(65) Prior Publication Data

US 2022/0279321 A1    Sep. 1, 2022

(51) Int. Cl.
| | | |
|---|---|---|
| *H04W 4/14* | (2009.01) | |
| *H04W 12/069* | (2021.01) | |
| *H04W 48/04* | (2009.01) | |
| *H04W 4/029* | (2018.01) | |
| *H04L 9/32* | (2006.01) | |

(52) U.S. Cl.
CPC ............ *H04W 4/14* (2013.01); *H04L 9/3226* (2013.01); *H04W 4/029* (2018.02); *H04W 12/069* (2021.01); *H04W 48/04* (2013.01)

(58) Field of Classification Search
None
See application file for complete search history.

(56) References Cited

U.S. PATENT DOCUMENTS

| | | | | |
|---|---|---|---|---|
| 2013/0262873 | A1* | 10/2013 | Read ................... | H04L 63/0861 |
| | | | | 713/186 |
| 2015/0072654 | A1* | 3/2015 | Moshir ................. | G06F 21/43 |
| | | | | 455/411 |

FOREIGN PATENT DOCUMENTS

GB    2518255 A  *  3/2015  ......... G06F 13/1689

* cited by examiner

*Primary Examiner* — Adolf Dsouza
(74) *Attorney, Agent, or Firm* — Staniford Tomita LLP

(57) ABSTRACT

Embodiments for providing secure communicate between a remote system in a private network by a mobile device using a mobile app using a short message service (SMS) protocol without using Internet Protocol (IP) communications. The mobile application is registered with the remote system using a pre-shared key (PSK), and SMS source validation by the remote system is performed using timestamp and location information provided by the mobile device. Any specified command to be executed on the remote system is validated against a set of authorized commands. Such embodiments are particularly useful for cases in which there is no or very low strength infrastructure for full Internet connectivity and/or where remote services desire to stay isolated with no public network connectivity.

18 Claims, 8 Drawing Sheets

| Starting Position | Ending Position | Length | Description |
|---|---|---|---|
| 1 | 10 | 10 | Latitude |
| 11 | 11 | 1 | Field Separator |
| 12 | 22 | 11 | Longitude |
| 23 | 23 | 1 | Field Separator |
| 24 | 39 | 16 | Date & Time in UTC |
| 40 | 40 | 1 | Field Separator |
| 41 | 50 | 10 | COMMAND ID |

FIG. 7A

Sample SMS Payload: Before Encryption

| 1 | 2 | 3 | 4 | 5 | 6 | 7 | 8 | 9 | X | 1 | 2 | 3 | 4 | 5 | 6 | 7 | 8 | 9 | 0 |

| 1 | 9 | 4 | 1 | 2 | 3 | 1 | 1 | 5 | 3 | 0 | Z |

| F | S | T | A | T | 1 | 2 | 3 | 4 |

Sample SMS Payload After Encryption (RSA - 512 Bit)

QHosfbwNw1TlKvMzrfgdNhivOat+Xt6GjJfkjkp3Xp5dNqDAkCzDcLdnMsbm7FprYymbmJg/LHPgcOl75x==

FIG. 7B

SECURE REMOTE ACCESS TO PRIVATE NETWORKS WITHOUT INTERNET CONNECTIVITY

TECHNICAL FIELD

Embodiments are generally directed to data network management, and specifically to providing secure remote access to private networks without Internet connection.

BACKGROUND

Data centers have become the backbone of modern information technology (IT) systems. A data center is generally a dedicated pace to house computers, data storage, telecommunication equipment, and other infrastructure equipment. Such data centers can be on the order of a floor within a building, an entire building, or even a large compound of multiple building spread over a significant geographical area. For critical IT applications, data centers often house redundant components for backup and recovery purposes and include robust power supply and environmental control equipment, such as HVAC and fire suppression systems.

Data centers often serve and are controlled by systems and administrators that are located quite far away. Thus, many distributed networks are based on data centers distributed around different locations, some of which may often be in remote or geographically separated areas. Although modern Internet Protocol (IP) communications networks generally provide ready access to data centers that might be located around the world, constant reliable access to data centers is not always guaranteed, especially data centers that are located within private networks, as opposed to public or cloud-based networks.

For example, access to data centers may be difficult or even impossible in situations such as when a user does not have Internet access for quick actions during natural calamities or cyber-attacks, or when the user has no or very low Internet bandwidth. Other limits to access may occur when the user wants to connect to the system immediately without using a virtual private network (VPN) connection. There may also be situations in which the administrator does not have proper access to a center, but has only a cellular network connection, which makes monitoring and managing systems in a remote location impossible.

What is needed, therefore is a system that enables a user to securely manage and monitor data centers and other IT systems in a private network over robust communication links without using Internet or VPN connectivity.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 7A illustrates the composition of an SMS packet payload, under some embodiments.

FIG. 7B illustrates a sample SMS payload before and after encryption, under some embodiments.

DETAILED DESCRIPTION

Figure 1:
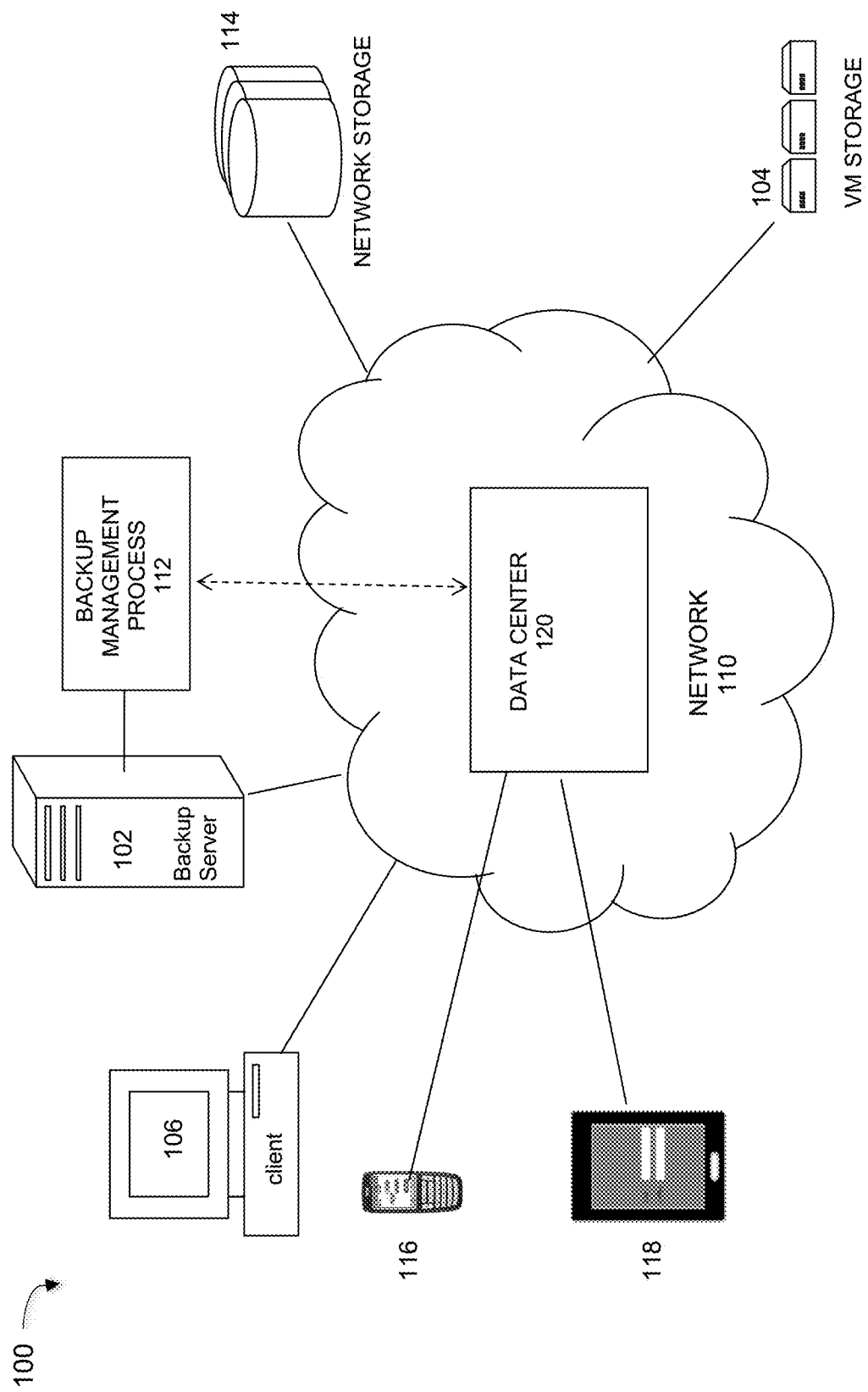
FIG. 1 illustrates a computer network that implements a remote data center access process, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

The described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or any suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments provide a system and method to remotely access a private network without Internet service through functional components that enable a user to securely manage and monitor systems in a private network over Short Message Service (text message) protocols without using VPN and internet from user side.

FIG. 1 illustrates a system for accessing a remote data center without Internet communications, under some embodiments. System 100 comprises a large-scale network that includes a number of different devices, such as server or client computers 102, data center resources, storage devices 114, and other similar devices or computing resources. Other networks may be included in system 100 including local area network (LAN) or cloud networks and virtual machine (VM) storage 104. These devices and network resources may be connected to a central network, such as a central or cloud computing network 110 that itself contains a number of different computing resources (e.g., computers, interface devices, and so on). FIG. 1 is intended to be an example of a representative system implementing a data center coupled to other network resources, and many other topographies and combinations of network elements are also possible.

For the example network environment 100 of FIG. 1, server 102 is a backup server that executes a backup management process 112 that coordinates or manages the backup of data from one or more data sources, such as other servers/clients to storage devices, such as network storage 114 and/or virtual storage devices 104, or other data centers.

In a data protection system, the backup targets or appliances included in a data center hosted in their own network 110. In many large distributed systems, a network housing a data center may be part of a public or cloud network that is provided by a cloud service provider. For the example embodiment of FIG. 1, network 110 housing data center 120 is a private network, or an otherwise restricted-access network that is not readily accessible through public channels.

Data center 120 may represent the computing resources running the information technology (IT) system of an organization or enterprise, and which are organized an interconnected in their own network 110. Typical data centers are relatively large-scale data centers that may be distributed around the world, but embodiments are not so limited. Any appropriate scale of intra- and inter-networked computers may be used, such as data centers within a state or region, municipality, or organization (e.g., corporation, school, University, hospital, etc.).

At least some of the networks of system 100 provide connectivity to the various systems, components, and may be implemented using protocols such as Transmission Control Protocol (TCP) and/or Internet Protocol (IP), well known in the relevant arts. These networks may also implement a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage. The storage devices represent protection storage devices that serve to protect the system data through the backup process 112. Thus, backup process 112 causes or facilitates the backup of this data to the storage devices of the network, such as network storage 114, which may at least be partially implemented through storage device arrays, such as RAID (redundant array of independent disks) components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source may be any appropriate data, such as database data that is part of a database management system within a data center comprising a server or servers and other clients, and the data may reside on one or more hard drives (e.g., 114) for the database(s) in a variety of formats. The backup server 102 may be a server running Networker or Avamar data protection software backing up to Data Domain protection storage, such as provided by Dell/EMC™ Corporation. However, other similar backup and storage systems are also possible.

In an embodiment, client computers 106 accessing network 110 may be any appropriate computing machine, such as a desktop computer, notebook computer, personal digital assistant, or the like. The client computer may also be embodied within a mobile communication device, such as a mobile phone 116, tablet device 118, etc. that provides access to the network 110 through one or more different communications protocols. The client computers may be coupled to network 110 over a wired connection, a wireless connection or any combination thereof. The client computers and devices are also assumed to have sufficient location-aware capability to provide a present location of the device to the network 110.

For the embodiment of FIG. 1, certain users or classes of users communicate with network 110 and data center 120 through mobile client devices 116 and 118, or through mobile communication applications loaded onto their desktop or portable computers. Mobile communication devices can include cellular telephones, tablet devices, or any communication device that has cellular communication capability. Such devices typically use one of GSM (Global System for Mobile communication or CDMA (Code Division Multiple Access) as the type of radio technology that allows phones and phone networks to transmit voice and data. Other similar and evolving standards for 5G and beyond can also be used, such as LTE and so on.

Besides voice communication, mobile devices also support messaging services to send small data messages to their recipients. The Short Message Service (SMS) is an example services that provides short text messaging between mobile phones, where the messages can be written and read by phone users, and can also be used as a medium for communicating between applications. SMS represents a type of text messaging service that uses standardized communication protocols that let mobile devices exchange short text messages. An intermediary service may be used to facilitate a text-to-voice conversion to be sent to landline telephones and devices. SMS was originally defined as part of the GSM standards, but SMS for other cellular systems are also available, such as CDMA SMS.

Embodiments provide a system and method to remotely access a private network without Internet service through functional components that enable a user to securely manage and monitor systems in a private network over Short Message Service (text message) or equivalent messaging protocol without using VPN and internet from user side. Embodiments allow a user to execute limited set of predefined functions for system operations in the remote system over SMS in a secure manner.

Figure 2:
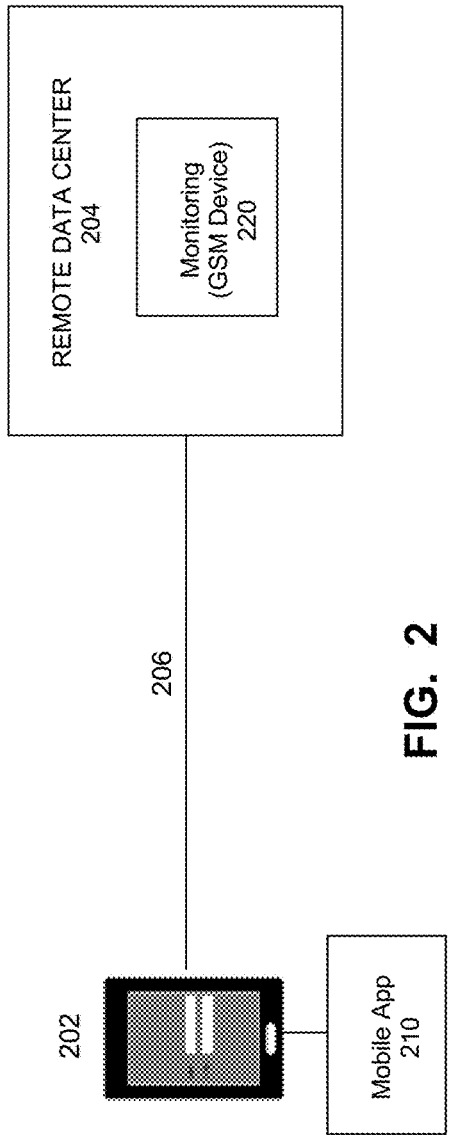
FIG. 2 illustrates functional components to implement the remote data center access process of FIG. 1, under some embodiments.

To implement these embodiments, system 100 includes two major functional components, as shown in FIG. 2. These functional components include: a mobile application 210 installed in the user's portable communication device 202. This mobile application has the ability to convert user input along with other information into an encrypted text message and send it to the remote system 204. In the remote system (e.g., data center) there is a monitoring component 220 (such as a GSM transceiver), which is connected to the system and will monitor for any incoming message from the user device 202. The process 220 runs in the server system that is in the data center or in the same private network 110 as the data center. The process has access to the mobile device 202 that can receive and send SMS messages over phone link 206. The monitoring device 220 may thus be a GSM device that has its own assigned telephone number.

Figure 3:
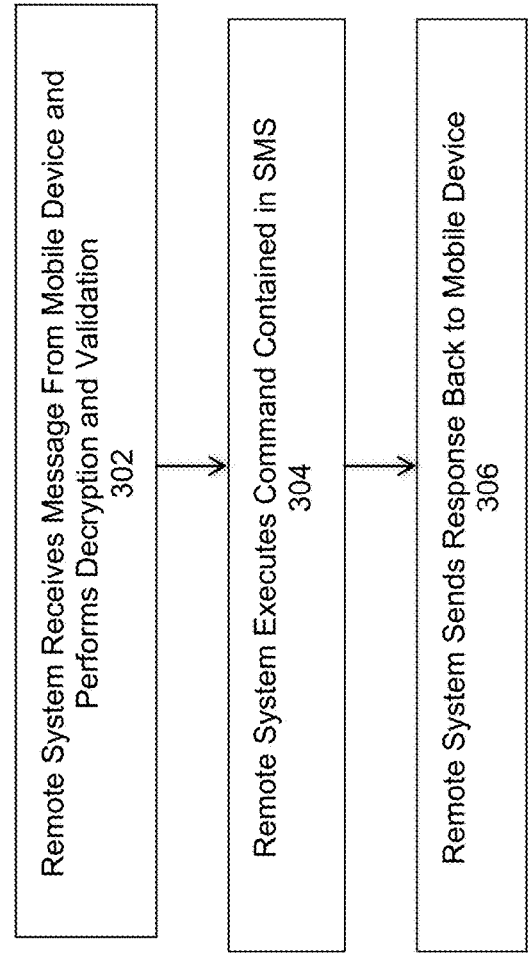
FIG. 3 is a flowchart illustrating a process of communication between the mobile application and monitoring process of FIG. 2, under some embodiments.

FIG. 3 is a flowchart illustrating a process of communication between the mobile application and monitoring process of FIG. 2, under some embodiments. When a new message is received from the mobile device 202, component 220 will process the new message by first decrypting and validating the message, 302. It will then execute the command in the system that is passed by the user over SMS, 304. In an embodiment, only certain commands will be allowed to be executed for messages sent from the mobile device to the remote system using SMS. Once an appropriate command has been executed, a response is then sent back from the remote system to the mobile app over the SMS link 206, step 306.

Figure 4:
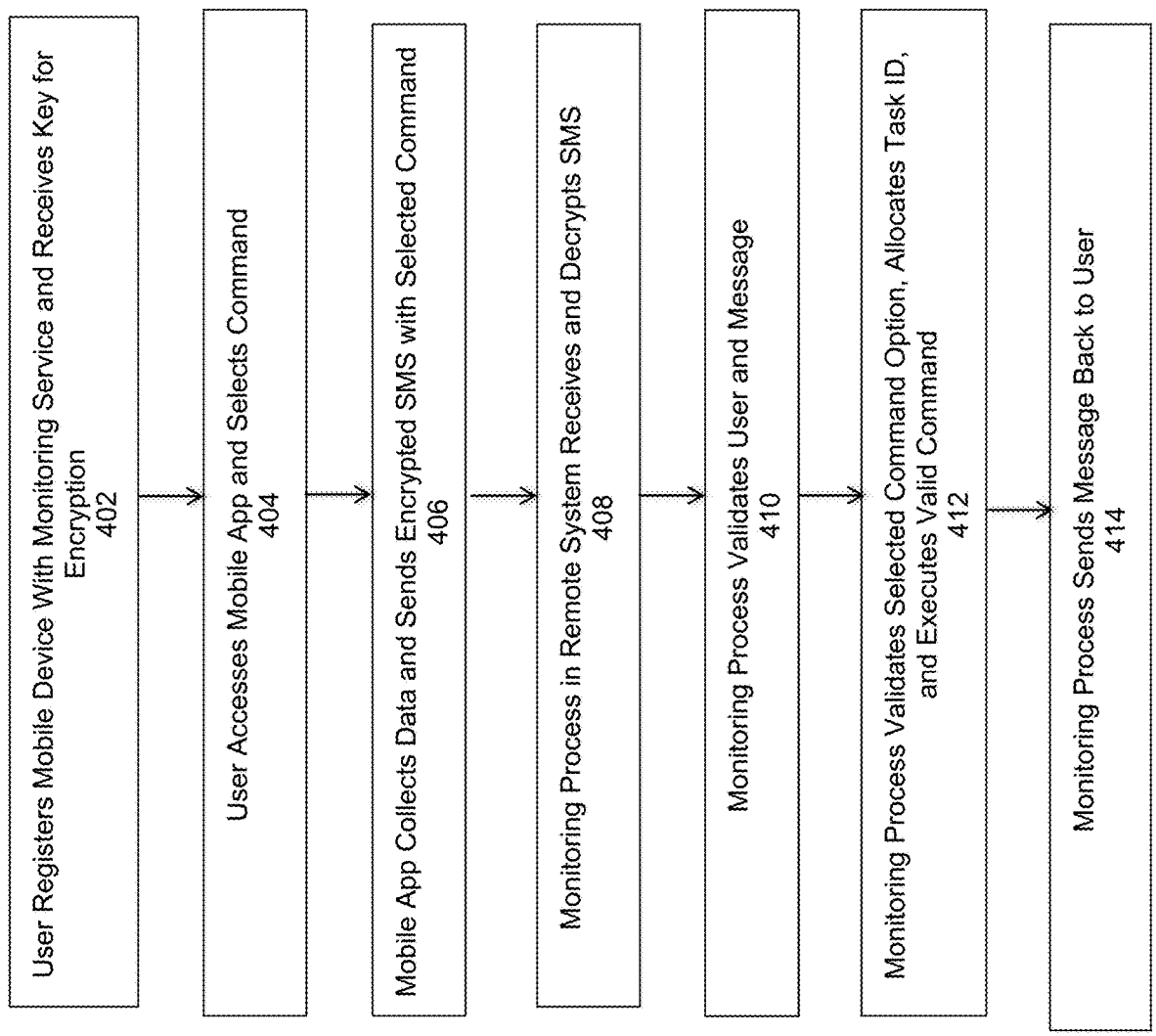
FIG. 4 is a flowchart 400 that illustrates on overall process of providing access to a remote system using SMS, under some embodiments.

FIG. 4 is a flowchart 400 that illustrates on overall process of providing access to a remote system using SMS, under some embodiments. The process of FIG. 4 begins with the user installing the mobile application on his or her mobile device, such as through a registration process that requires defining a user name and passphrase or PIN, 402. Through this process, the user also registers the mobile number of the mobile device with the monitoring process. As part of this initial registration, the monitoring process can generate a Pre-Shared Key (PSK) as for use by the mobile device to encrypt messages using the mobile app. A secure mechanism can be used to provide the key information from the remote system to the mobile device. For example, a QR (Quick Response) code can be displayed to the user, the PSK will sent to the mobile app by scanning the QR code. Alternatively, a two-factor authentication process, third-party escrow, or other similar validation method can be used to download the PSK to the mobile phone.

Once the mobile app is loaded and registered, the user can then use it to access information and/or send remote commands to the remote system by first accessing the mobile app and selecting the appropriate action or command, 404. For system integrity and security, the remote system may limit the commands or types of commands or actions that can be performed or requested through the remote app. For example, requests for information or system status may be freely provided through the mobile app, along with certain routine tasks that do not pose a significant threat to the system if misused. For example, system shutdown, file/directory deletion, node removal, and other operations may be disallowed in the mobile app, while certain routine or disaster recovery functions such as initiating backups, copying log files, sending alerts, and so on, may be allowed.

In an embodiment, a list of supported options will be displayed in the mobile app for user selection. Upon selection of a valid action or command, The mobile app will internally collect certain relevant information including (1) a timestamp for the action, and (2) location (GPS) information of the user). The mobile device collects this information and encrypts it together with the user selected option using the PSK provided by the remote system. The mobile app then sends a SMS (text message) of the encrypted message to the monitoring process in the remote device, 406.

The monitoring process receives the SMS and decrypts it with the PSK that is allocated for the mobile number, 408. The monitoring process then validates the sender mobile number to validate the mobile device, 410. As part of this validation step, the monitoring process also verifies that the sender's GPS info matches any pre-defined geo-location boundary set for the user. In this manner, the system can enforce any restrictions on personnel with regard to proximity or location requirements. For example, it may be undesirable to allow users in other countries or regions to access or perform remote operations using SMS to the remote system.

As shown in FIG. 4, after the validation step, the monitoring process validates the received message by collecting the timestamp from the decrypted SMS and verifying that the system current time and SMS timestamp is within an acceptable time limit. This requires that SMS messages be sent and received in a timely manner and prevents stale or previously scheduled messages to affect the remote system. The monitoring process will then validate the user selected command option, allocate a task ID, and execute the valid command or function in the remote system, 412. The task ID along with the execution status will be sent back to the user, and once the task is completed the result will be sent back to the user, as well, 414.

Figure 5A:
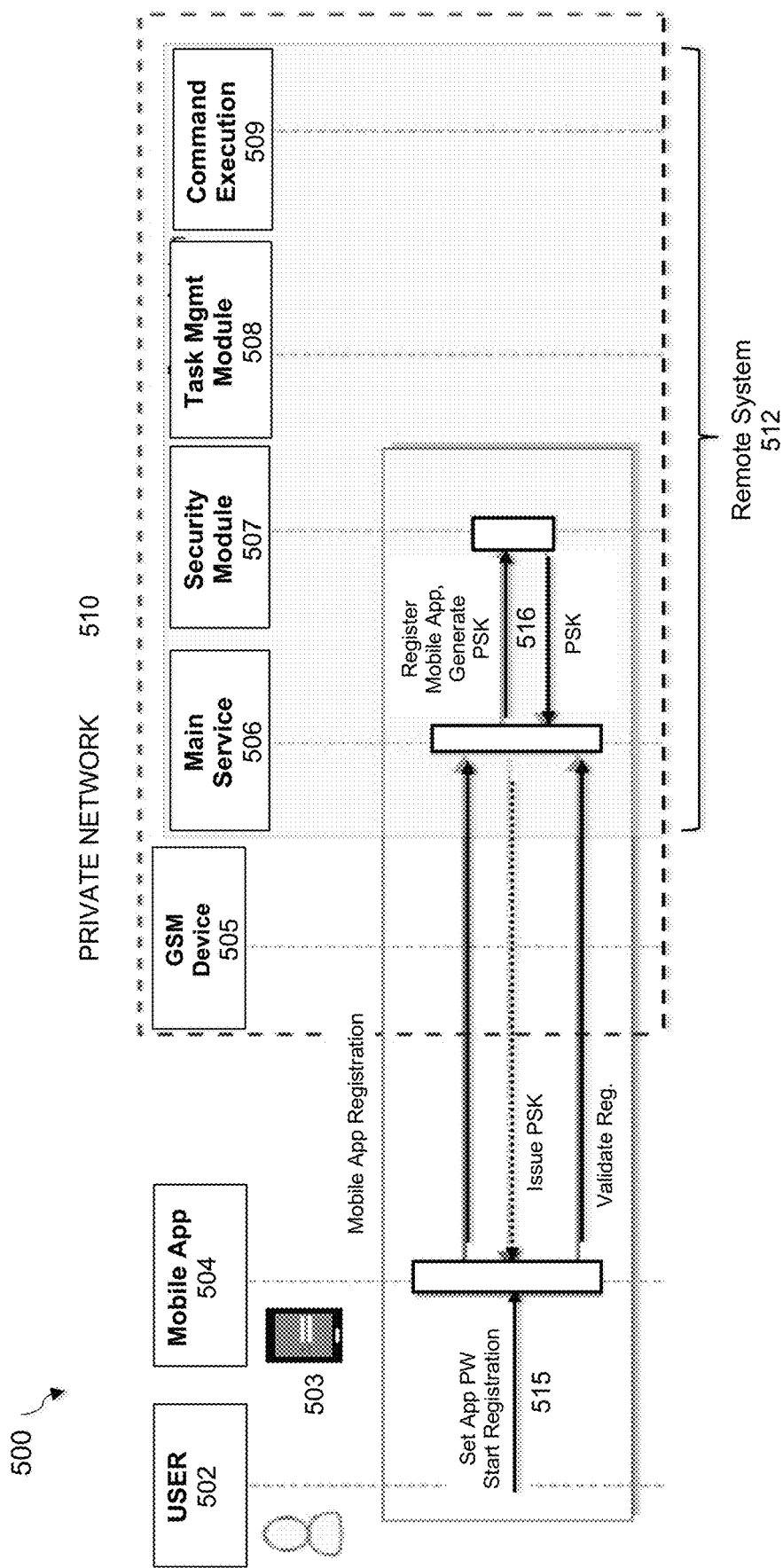
FIGS. 5A and 5B are sequence diagrams illustrating an execution of the remote access process using SMS messages as illustrated in FIG. 4, under some embodiments.

FIG. 5A is a sequence diagram of the process of FIG. 4, under some embodiments. Diagram 500 of FIG. 5A shows functional interaction of some of the major components of the remote access process. In this system, a user 502 through mobile device 503 running mobile app 504 accesses a private network 510.

As shown in diagram 500, the system is divided into a user space comprising the user 502 and their portable device (e.g., cell phone or tablet) 504, and the private network 510 hosting the remote system 512. The remote system 512 may be embodied in a data center, networked server, or any other network resource that is desired to be accessed by the user 502. For the embodiment of FIG. 5A, the private network also includes a GSM device 505 that is a hardware component configured to send and receive SMS messages. Any appropriate device may be provided, such as a SIM 900 GSM Module, and the like. The GSM device 505 can be connected to the remote system 512 through a UART (Universal Asynchronous Receiver Transmitter) interface with communication comprising AT commands. Any other appropriate asynchronous or synchronous serial communication interface can be used as well. Alternatively, the GSM device 505 or GMS device functionality may be embodied as a component internal to the remote system 512 itself.

The remote system 512 comprises several components including main service 506, security module 507, task management module 508, and command execution component 509. The main service 506 is a process that registers the mobile app 504 to the system and generates a PSK using the security module 507. It also continuously monitors the GSM device 505 and checks for any incoming SMS messages coming in over the UART interface using AT commands, reads messages from GSM device 505 through UART using AT commands, and prepares any messages that need to be sent to the user 502, and passes these outgoing messages to GSM module 505 for transmission out of the private network 510.

The security module 507 can implemented as part of the main service 506 or as separate process (as shown), and is responsible for registering the mobile app 504 to the system. It also generates and stores the PSK assigned to the mobile device 503. As part of this registration process, the security module 507 stores the device's mobile number, the IMEI (International Mobile Equipment Identity) number of the hardware, the user ID and any other relevant available information. The security module 507 also validates whether the message received is on a list of authorized phone numbers, and decrypts the received SMS with the PSK that is allocated for the phone number, where the output contains GPS location of the user's mobile, the timestamp of the message, and the command. It also validates the SMS message by verifying that it was sent from within permissible geographical boundary limits, and within an appropriate time period by checking the timestamp against any time limit rules.

The task management module 508 is used once the received SMS message is validated. This module creates a task with the command information that is sent by the user in the SMS message. The created task will be pushed to a task queue and will be assigned a unique task ID that is generated and passed on to the user 502 through main service 506. This module 508 will also take care of monitoring the task, and once the task is completed it will pass on the response to the main service 506.

With respect to command execution 509, for each command or set of commands which is intended to be executed in the remote system 512, there will be a respective command ID assigned to it, which will be used throughout the system. For example, a command ID may appear as "SMFS01: filesys status," or "BK001:backup." From the mobile app 504, when the user 502 selects a UI button on the mobile device UI, a corresponding command ID in the portable device backend will be added part of SMS message. As part of the task execution by the task management module 508, the corresponding command for the given command ID will be retrieved and will be executed on the system by command execution process 509.

The available commands typically include general file access commands as well as application-specific commands that depend on the application being used. For example, a backup application may have commands to start or stop a backup or restore, schedule a backup period, set a backup type (full, incremental, etc.), and so on. Some relevant commands for an application may be disallowed from use by user 502 through the mobile app 504 to limit the possibility of undesired or dangerous remote control outside of normal communication channels. Classes of commands may be designated as allowed or disallowed, such as Get commands (allowed) and Set commands (disallowed). Likewise, commands that perform specific tasks that might be harmful, such as password changes, deletion of significant data objects, and so on, may be disallowed.

The components of remote system 512 and private network 510 are provided for purposes of illustration, and embodiments are not so limited. The functions of certain components may be combined to form other components. Likewise additional components may be provided that perform at least parts of the enumerated functions, or that provide additional features to the remote system 512.

Figure 5B:
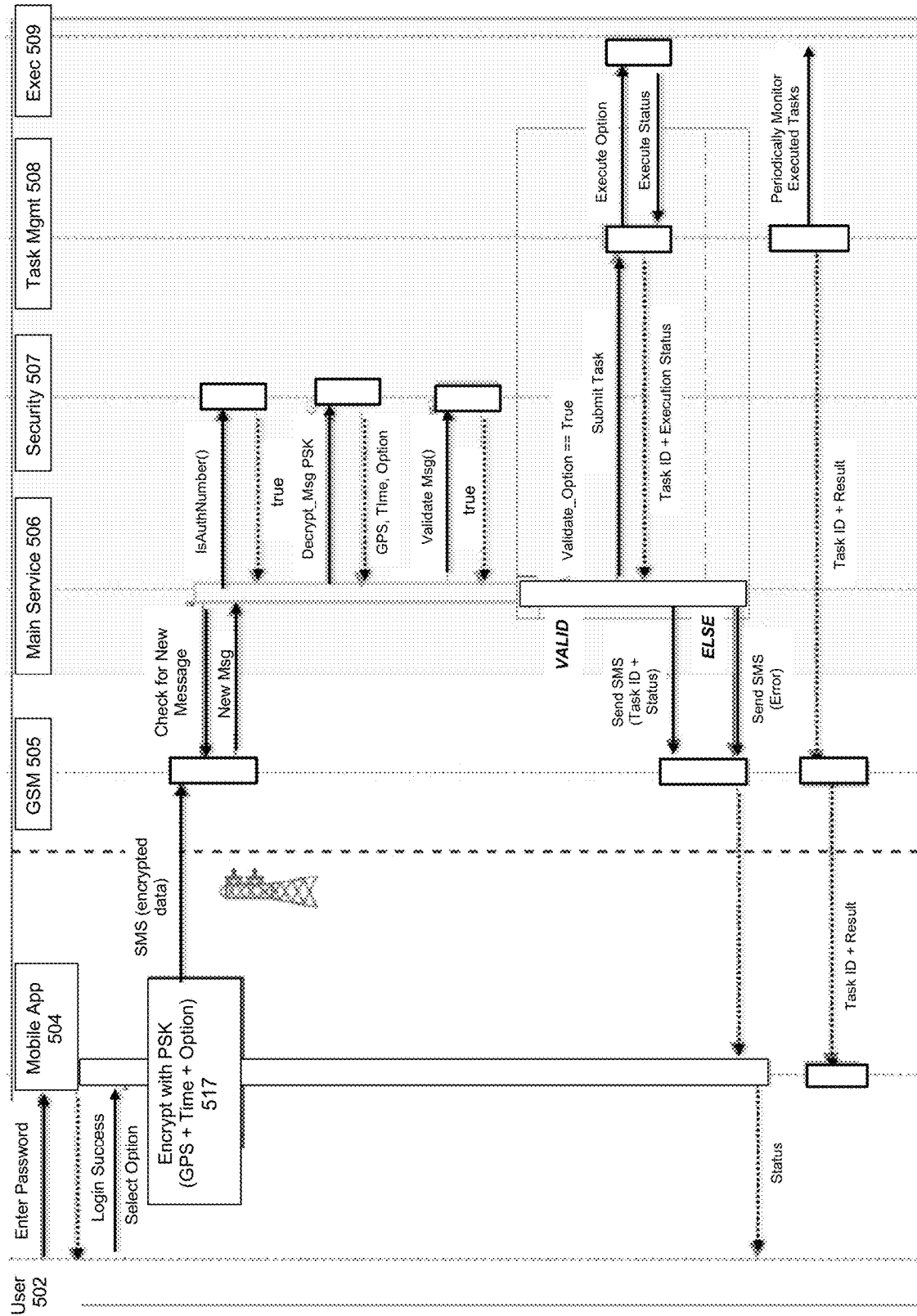

The components of FIGS. 5A and 5B are used to illustrate an execution of the remote access process using SMS messages as illustrated in FIG. 4, under some embodiments. The mobile application 504 will be installed in the user mobile device 503, which has the capability to send and receive text messages over GSM, CDMA, or any other applicable cellular or radio communication system. The registration process begins with the user 502 setting the password on their device and initiating registration 515. After receipt of the registration request by the remote system 512 through the GSM device 505, the registration request is then sent to the security module 507 through the main service 506. The security module 507 registers 516 the mobile app 504 and generates a PSK using the security module 507. The security module 507 then sends the PSK back to the main service 506, which issues the PSK to the mobile app 504 through a QR or similar mechanism. The mobile app then uses the PSK to validate the registration in the main service 506.

FIG. 5B is a sequence diagram illustrating a process of receiving, validating and executing a received SMS message in a remote system, under some embodiments. To send a message, the user first accesses the mobile app by entering the appropriate credential (login, PIN or password) and once logged in selects an option specifying a resource in the private network 510 to be accessed or a command to be executed.

Figure 6:
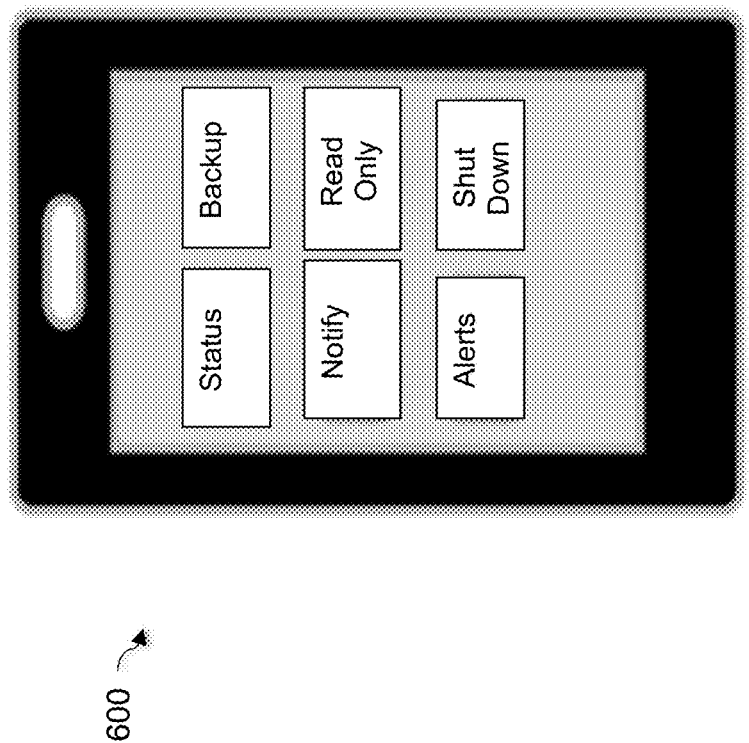
FIG. 6 is an example user interface of a mobile app running on a user mobile device, under some embodiments.

The mobile app can provide a simple user interface for the user 502 to register, login, and use the mobile app. For example, the login page can simply prompt the user to enter the user's 'login name' and PIN through the device's input interface (keyboard or touchpad). Once logged in, the user can select from a menu such as shown in FIG. 6. For the example of FIG. 6, the user allowed options provided by the remote system include obtaining the system status, performing a backup, sending or receiving notifications, entering Read-Only mode, sending or receiving alerts, or shutting down the system. The example user interface 600 of FIG. 6 is provided for purposes of illustration only, and any number of different options and commands may be provided by the remote system for the user to access or invoke on the remote device.

When the user selects an action to be taken through the UI, certain steps are executed by the mobile app 504. First, it assigns a command ID for the command button clicked, second it captures the location (GPS) data of the device at its current location; and third, it captures the time stamp of the command. The mobile app then packages and encrypts 517 all of this information with the PSK that is issued during registration workflow (as shown in FIG. 5A). This encrypted information is then sent as an SMS message to the remote system 512. The GSM device 505 in the private network (or remote system) receives the SMS message and passes it along to the main service 506 of the remote system. The security module 507 then validates the message by checking the phone number of the mobile device of the mobile app

504. For a validated message it then decrypts the SMS message with the PSK and returns the encoded location information, timestamp and command option. When this check is complete, the main service submits the task corresponding to the command option to the task management module 508 for execution by the command execution component 509. The execution status is then returned by the command execution component to the main service 506, which packages the status as an SMS with the particular task ID for transmission by GMS device 505 back to the user mobile device. If the task was not executed properly, an error message can instead be sent. The task management module 508 also periodically monitors all tasks in the command execution component 509 and can send appropriate messages back to the user as well.

As described above, communication between the user mobile device and the remote system is implemented through the use of SMS messages. These SMS messages comprise data elements packaged as standard SMS payloads. FIG. 7A illustrates the composition of an SMS packet payload, under some embodiments. For the example embodiment of FIG. 7A, table 700 illustrates the packet format as comprising a starting position, an ending position, length, and description. The starting and ending positions and length specify the position within the payload for the corresponding data element specified by the description. A possible set of descriptions comprises the GPS location as provided by field separated Latitude and Longitude coordinates, the Date and Time in UTC for the timestamp, and the Command ID for the command selected by the user. Any number of different commands may be supported by the system depending on system constraints and requirements, and as limited by the packet format of Table 700.

In general, SMS imposes a character limit (e.g., 160 characters) so the payload 702 will be packaged accordingly. To increase message length, techniques like using concatenated SMS can be used. Depending on the packet and payload size of the messaging protocol, more or different data elements and descriptions may be provided by the mobile app for packetization in the message sent to the remote system. For example, additional data elements may include network and sub-network information, system topography, and/or certain user-specific characteristics such as role-based access rights, and other trust establishment protocols. Table 700 of FIG. 7A illustrates just one example of an SMS payload, and embodiments are not so limited.

Once packetized, the SMS payload is then encrypted using the PSK to create an encrypted SMS payload. This encryption process can use 512-bit RSA or any similar encryption algorithm. FIG. 7B illustrates a sample SMS payload 702 before encryption, and after encryption 704, under some embodiments.

Although embodiments are described with respect to SMS messages, any similar or other messaging protocol may be used. In general, the messaging protocol should be capable of being implemented without requiring Internet connectivity. The messaging protocol should be lightweight and native to or easily installable on a mobile device or provided as part of a mobile carrier package. SMS represents a type of messaging protocol that is readily available on a global basis, and is robust enough to operate over long ranges and in a variety of environmental and operational conditions.

The remote system access process can be used primarily in emergency or disaster recovery applications where access to the remote system is required when a primary (e.g., Internet) communication channel goes down or is severely limited in bandwidth. In this case, a few crucial operations may need to be performed to safeguard data or system operations, and initiate any appropriate remedial or recovery operations. The command options available for use by the mobile app can therefore be limited to such commands, both to provide a compact and efficient option menu to the user on the front-end and to limit the number of operations that may need to be performed on the backend. Such commands can typically be implemented using short text messages, such as those provided by SMS, and similar messaging protocols.

For example, in a data backup or data protection system running daily or periodic backups for many multiple data sources onto data center storage targets, the SMS messaging system can be used to communicate directly with the backup or data center servers to quickly initiate emergency procedures such as snapshot backups, failover replication, system cloning, and so on. For physically operating remote systems, such as factories, power plants, and so on, the SMS messaging system can be used to trigger alerts, shutdown machines, divert materials, and so on.

Embodiments thus provide the capability to securely communicate between Data centers (systems in private network) and Mobile app over SMS without using internet for emergency situations. They also provide SMS source validation using GPS and authentication mechanisms, and remotely execute tasks without using the Internet in a private network system.

Such embodiments are particularly useful for cases in which there is no or very low strength infrastructure for full Internet connectivity and/or where remote services desire to stay isolated (off-grid) with no public network connectivity.

System Implementation

Figure 8:
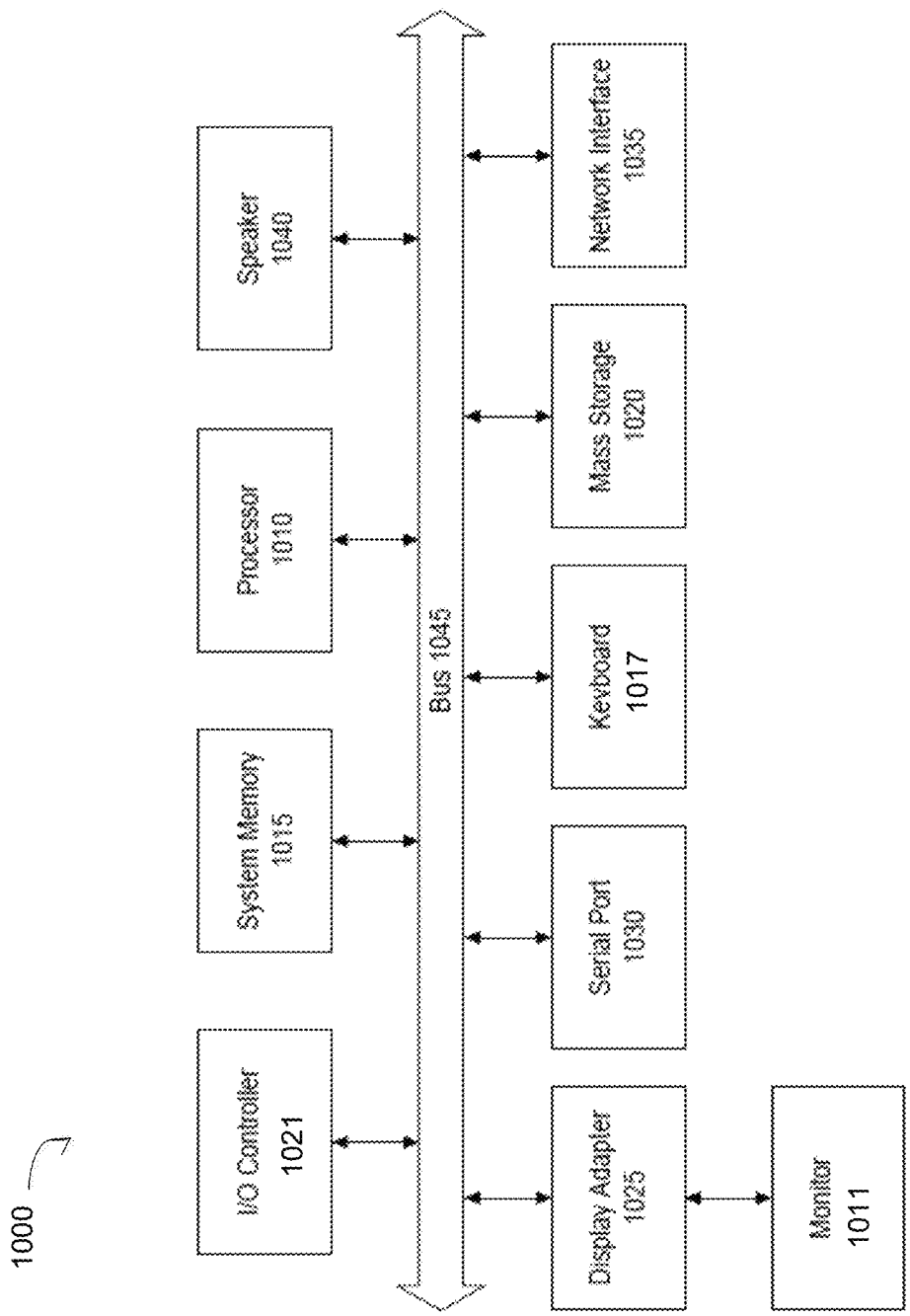
FIG. 8 is a block diagram of a computer system used to execute one or more software components of a remote system access process using SMS, under some embodiments.

FIG. 8 is a block diagram of a computer system used to execute one or more software components of an SMS-based remote system access process, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of accessing a remote system from a mobile device operated by a user, comprising:
   providing a mobile application installed on the mobile device for selecting a command perform an operation on the remote system, the mobile device providing communication over a radio-based transmission medium;
   sending a pre-shared key (PSK) from the remote system to the mobile device;
   determining, on the mobile device, operational information and a command identifier for the command to be performed;
   packaging the operational information and command identifier into a short message service (SMS) payload;
   encrypting the SMS payload for transmission to the remote system;
   receiving the encrypted SMS message payload in a receiver configured to communicate with the mobile device over the radio-based transmission medium;
   decrypting the received SMS message for execution of the selected command by the remote system
   defining one or more operational constraints for the mobile device and the user, and one or more message constraints for the SMS message, and one or more command constraints for the selected command; and
   validating the received SMS message at the remote system to produce a valid message or an invalid message by: decoding the decrypted SMS message to unpack the operational information, message information, and selected command; comparing the operational information to the operational constraints, comparing the message information to the message constraints, and comparing the selected command to the command constraints.

2. The method of claim 1 wherein the operational information comprises a geographic location of the mobile device and a timestamp of the command selecting.

3. The method of claim 1 wherein the radio based transmission medium comprises one of a GSM or CDMA cellular telephone network interface.

4. The method of claim 3 wherein the mobile device is one of a cellular telephone or a tablet computer utilizing the cellular network.

5. The method of claim 4 further comprising registering the mobile application with the remote system by:
receiving credentials of the user in the remote system through a registration process on the mobile device;
registering a telephone number of the mobile device with the remote system;
generating the PSK upon verification of the credentials;
transmitting the PSK from the remote system to the mobile device through a secure exchange process; and
validating the registration upon acknowledged receipt of the PSK in the mobile device.

6. The method of claim 5 wherein the secure exchange process comprises a Quick Response (QR) code scan process using a QR code sent from the remote system to the mobile device.

7. The method of claim 1 further comprising:
executing the selected command for a valid message in the remote system and sending a command execution status message back to the mobile device; and
blocking execution of an invalid message and sending an error message back to the mobile device.

8. The method of claim 1 wherein the operational constraints comprise a location of the mobile device relative to the remote system.

9. The method of claim 1 wherein the message constraints comprise an age of the SMS message.

10. The method of claim 1 wherein the command constraints comprise a selection of an allowable command among a superset of possible commands to be executed on the remote system.

11. A method of controlling a remote system from a mobile device operated by a user using selected commands and not using Internet connectivity, comprising:
sending a short message system (SMS) message comprising a command identifier, a timestamp of the command, and a location of the mobile device;
encrypting the SMS message at the mobile device for transmission to the remote system;
receiving, in the remote system, the encrypted SMS message;
decrypting and decoding the received SMS message to recover the command identifier, the timestamp, and the location;
validating the recovered command identifier, timestamp, and location against respective validation values set by the remote system to generate a valid message; and
executing an operation identified by the command identifier upon generation of a valid message.

12. The method of claim 11 further comprising:
sending a command status message from the remote system to the mobile application upon execution of the operation for the valid message; and
sending an error message to the mobile application for a non-valid message.

13. The method of claim 11 further comprising registering the mobile application with the remote system by:
receiving credentials of the user in the remote system through a registration process on the mobile device;
registering a phone number of the mobile device with the remote system;
generating the PSK upon verification of the credentials;
transmitting the PSK from the remote system to the mobile device through a secure exchange process; and
validating the registration upon acknowledged receipt of the PSK in the mobile device.

14. The method of claim 13 wherein the mobile device includes a cellular telephone circuit utilizing one of a GSM or CDMA cellular telephone network interface, and wherein the remote system includes a telephone receiver configured to send and receive radio signals compatible with the mobile device.

15. The method of claim 11 wherein the respective validation values comprise:
a selection of an allowable command among a superset of possible commands to be executed on the remote system,
an age of the SMS message, and
a location of the mobile device relative to the remote system.

16. A system for accessing a remote system, comprising:
a mobile device operated by a user accessing and having installed thereon a mobile application for selecting a command perform an operation on the remote system, the mobile device providing communication over a radio-based transmission medium and determining operational information and a command identifier for the command to be performed, packaging the operational information and command identifier into a short message service (SMS) message payload, and encrypting the SMS message payload using a pre-shared key for sending to the remote system;
a first remote system component receiving the SMS message sent by the remote mobile device over the radio-based transmission medium;
a second remote system component generating the PSK for the mobile device, and validating the received SMS message by comparing the operational information to defined limits and comparing an operation specified by the command identifier to a set of allowable operations;
a third remote system component decrypting the received SMS message for execution of the selected command by the remote system; and
a fourth remote system component executing the specified operation for a validated command.

17. The system of claim 16 wherein the second remote system component sends a command status message back to the mobile application upon execution of the validated command.

18. The system of claim 16 wherein the operational information comprises a geographic location of the mobile device and a timestamp of the command selection, and wherein the radio based transmission medium comprises one of a GSM or CDMA cellular telephone network interface, and further wherein the mobile device comprises a cellular telephone or a portable computing device incorporating a cellular telephone circuit.

* * * * *